(12) United States Patent
Wilkinson et al.

(10) Patent No.: US 9,299,040 B2
(45) Date of Patent: Mar. 29, 2016

(54) SYSTEM AND METHOD FOR GENERATING AN INFORMATION INTEGRATION FLOW DESIGN USING HYPERCUBES

(75) Inventors: William K. Wilkinson, San Mateo, CA (US); Alkiviadis Simitsis, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 974 days.

(21) Appl. No.: 12/912,228

(22) Filed: Oct. 26, 2010

(65) Prior Publication Data
US 2012/0101978 A1    Apr. 26, 2012

(51) Int. Cl.
*G06F 17/30* (2006.01)
*G06Q 10/06* (2012.01)

(52) U.S. Cl.
CPC .......... *G06Q 10/06* (2013.01); *G06F 17/30563* (2013.01)

(58) Field of Classification Search
USPC ........................................................ 707/602
See application file for complete search history.

(56) References Cited

U.S. PATENT DOCUMENTS

| | | | |
|---|---|---|---|
| 7,139,779 B1* | 11/2006 | Kornelson et al. | |
| 7,383,252 B2* | 6/2008 | Soogoor | |
| 7,487,173 B2* | 2/2009 | Medicke et al. | |
| 7,571,182 B1* | 8/2009 | Eddy | |
| 2004/0015381 A1* | 1/2004 | Johnson et al. | 705/8 |
| 2004/0103051 A1* | 5/2004 | Reed et al. | 705/36 |
| 2007/0027904 A1* | 2/2007 | Chow et al. | 707/102 |

OTHER PUBLICATIONS

Robert Davenport, "data Academy—ETL vs ELT", Jun. 2008, V1.1, 12 pages.*
Z. E. Akkaoui et al. "Defining ETL worfklows using BPMN and BPEL. In DOLAP", pp. 41-48, 2009.
Ashish Gupta et al. "Modeling Multidimensional Databases", In ICDE, pp. 232-243, 1997.
Kamal Bhattacharya et al. "Towards Formal Analysis of Artifact-Centric Business Process Models" In BPM, pp. 288-304, 2007.
Umeshwar Dayal, et al. "Data integration flows for business intelligence" In EDBT, pp. 1-11, 2009.

(Continued)

*Primary Examiner* — Cam-Linh Nguyen
(74) *Attorney, Agent, or Firm* — Trop, Pruner & Hu, P.C.

(57) ABSTRACT

A system, method, and computer readable medium for generating an information integration flow design (IIFD). The system includes a processor to receive a conceptual model of the IIFD, having an extract phase, a load phase, and a transformation phase, an extract unit to model an interface between a data source information object and a transformation function based on at least one extract hypercube, a load unit to specify at least one load hypercube and a data warehouse target object, a transformation unit to express one or more steps as a hypercube operation, and a translation unit to generate the IIFD based on the conceptual model. The method includes receiving a conceptual model of the IIFD having an extract phase, a load phase, and a transformation phase. The method generates logical information integration operations based on the conceptual model. A computer readable medium may include instructions to generate the IIFD.

20 Claims, 8 Drawing Sheets

(56) References Cited

OTHER PUBLICATIONS

Umeshwar Dayal, et al. "Business Processes Meet Operational Business Intelligence" In IEEE Data Eng. Bull. 32(3), pp. 35-41, 2009.

Sergio Luján-Mora, et al. "Data Mapping Diagrams for Data Warehouse Design with UML." In ER, pp. 191-204, 2004.

Alkis Simitsis, et al., "QoX-driven ETL design: reducing the cost of ETL consulting engagements." In SIGMOD Conference, pp. 953-960, 2009.

Alkis Simitsis, et al., "Optimizing ETL workflows for fault-tolerance". In ICDE, pp. 385-396, 2010.

Panos Vassiliadis. "Modeling Multidimensional Databases, Cubes and Cube Operations". In SSDBM, pp. 53-62, 1998.

* cited by examiner

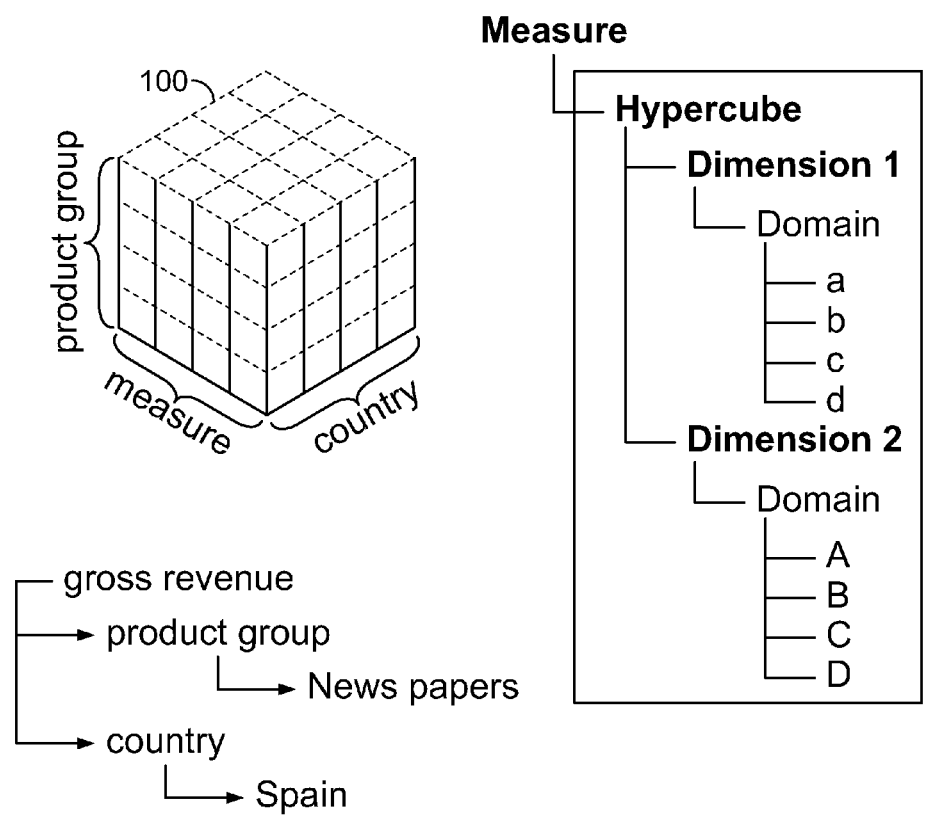
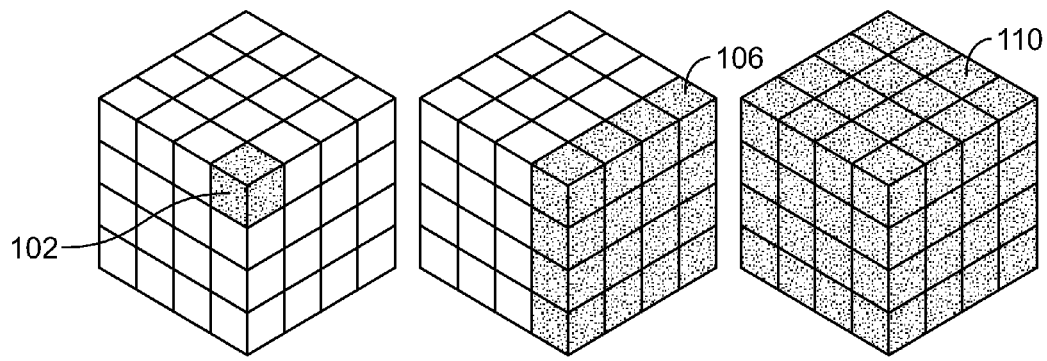
FIG. 1A
FIG. 1B

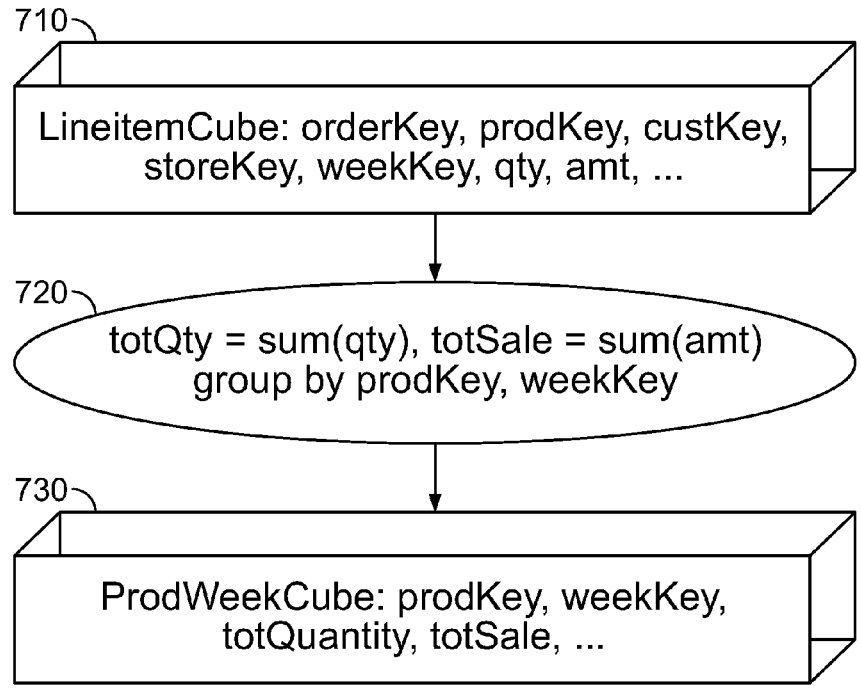

FIG. 7

IdRes (Cube, Id, Map)
// Assume Cube has an Id dimension
// Assume Map has one dimension, Id, and a cell value, "Key"
Ids = slice (Cube, Id)
Keys = join ( Ids, Map ) on Id
NewIds = diff ( Ids, Keys )
NewKeys = push ( keyGen ( NewIds.Id ), "Key" )
// push adds an item to a cell, keyGen generates a new key
Map = outer join ( Map, NewKeys ) // update Map
AllKeys = outer join ( Keys, Newkeys ) on Id
Cube = outer join ( Cube, AllKeys ) on Id // update Cube

FIG. 8

BandDim (Cube, Dim, BandLbl, Map)
// Assume Cube has a dimension, Dim, to band as BandDim
// Assume Map has one dimension, Low, that is the Lower
// bound of each band and a cell value, "Label"
Vals = slice (Cube, Dim)
Bands = join ( Vals, Map ) on max ( Vals < Low )
// Bands has dimensions Dim, Low and cell value, Label
Bands = pull ( Bands, Label as BandLbl )
// makes Label a dimension with the name BandLbl
Bands = slice ( Bands, Dim, Label ) // drop Low dimension
Cube = join ( Cube, Bands ) on Dim
// Cube has a new dimension BandLbl with a label for Dim
// push adds an item to a cell, keyGen generates a new key
Map = outer join ( Map, NewKeys ) // update Map
AllKeys = outer join ( Keys, NewKeys ) on Id
Cube = outer join ( Cube, AllKeys ) on Id // update Cube

FIG. 9

// assume CustCube: custKey, custId, name, addr, age, income, ...
// need to create load hypercube for Warehouse Customer Dim and
// Demographics Dim
DemoRes ( CustCube )
CustLoadCube = slice (CustCube, CustKey, name, DemoKey,....)
DemoLoadCube = slice (CustCube, demoKey, ageBand, incomeBand, ....)

FIG. 10

SYSTEM AND METHOD FOR GENERATING
AN INFORMATION INTEGRATION FLOW
DESIGN USING HYPERCUBES

BACKGROUND

Enterprises and organizations may have information located in many different and diversely located databases. For example, a manufacturing enterprise may have customer contact information in a sales department database, accounting database information (e.g., invoicing, accounts receivable, payment, credit, etc.) may be in another database, manufacturing department information (e.g., bill of parts, vendor, assembly instructions, etc.) may be in yet another database. Or, several departments may have customer information in each database, but the information may be listed differently for each database (by name, by account number, by phone number, or first name last, last name first, etc.). An information integration flow may define and/or describe the process of gathering the information in these databases and relocate the information to a common repository referred to as a data warehouse.

An information integration flow may be a series of instructions that may be responsible for extracting data from data sources, transforming the data, and finally, loading the data in a central data warehouse. The design of an information integration flow may proceed from a conceptual model to a logical model, and then a physical model and implementation. The conceptual model may convey at a high level the data sources and targets, and the transformation steps from sources to targets.

BRIEF DESCRIPTION OF THE DRAWINGS

FIG. 1 depicts a conventional hypercube representation;

FIG. 7 depicts transformation function in accordance with an embodiment of the invention;

FIG. 8 depicts pseudo code in accordance with an embodiment of the invention;

FIG. 9 depicts pseudo code in accordance with an embodiment of the invention;

FIG. 10 depicts pseudo code in accordance with an embodiment of the invention.

DETAILED DESCRIPTION

Figure 2:
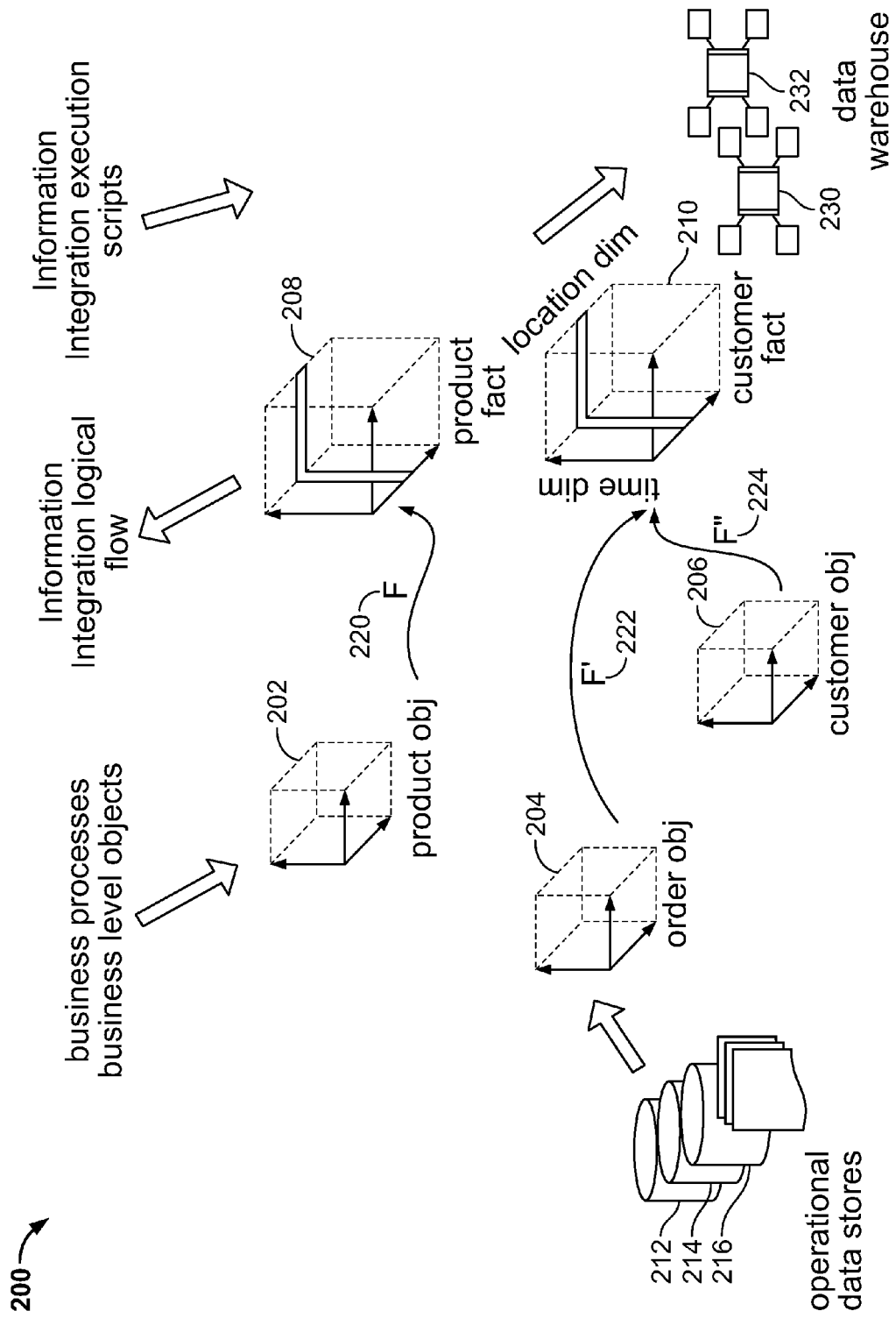
FIG. 2 depicts an information integration flow design lifecycle in accordance with an embodiment of the invention.

A method in accordance with an embodiment of the invention provides a process for generating an information integration flow design. The method may inject several layers of optimization and validation throughout the process beginning with business level objectives and ending with logical flow design. The method may provide a solution that can assist consultants in defining the needs and requirements of an information integration flow design project at its early stages.

The method may provide a conceptual model for information integration flow design based on hypercubes and hypercube operations. The method may be applied as a formal model that can capture the semantics of information integration flow design at a high-level but that can also be machine translated into a logical model for information integration.

The use of hypercubes at the conceptual level may render a design that can be easily understood by business users. There is currently little support for conceptual designs and typically logical designs are built using requirements written in an ad hoc way in text documents or spreadsheets with each practitioner using their own best practices. Consequently, the details captured by these models vary widely across projects. Conceptual models devised for one project may not be comprehensible to others without help from those who devised the models.

By using hypercubes at the conceptual lever, the method may reduce design and development time and may produce a result that can accurately capture service level agreements and business requirements.

FIGS. 1A-1B depict a conventional representation of hypercube 100. A hypercube may define the Cartesian product of the combinations of measures and dimensions. A Cartesian product is the product of two sets, so the product set contains all possible combinations of one element from each set. The Cartesian product can be extended to products of any number of sets. The product set based on two finite sets can be represented by a table. Each cell of such a table may be a combination of one element of the set row and one element of the set column. Each additional finite set may result in another dimension to the table resulting in a hypercube.

A hypercube can be assigned to measures (e.g., gross revenue). The dimension members a, b, c, d, A, B, C, D may be attached to a domain. The domains may be attached to dimension Dimension1, Dimension2 and the dimensions are assigned to a hypercube. The hypercube may be defined by the dimensions. The measures may be associated with the cells of the hypercube. Depending on the position of the measure in the data hierarchy, the measure may be aggregated by specifying a cell 102, a group of cells 106, or a complete cube 110.

The use of a formal language for defining information integration flow conceptual models may have several advantages. A formal language model may provide a common vocabulary of objects and operations so models can be understood without the help of the designer. A formal model may make feasible the automatic generation of a logical model from the conceptual model. Using a formal language may make feasible the computation of properties over the model (e.g., such as differences between successive versions of the model, or provenance information such as which targets are derived from which sources). Hypercubes may be a natural formalism to business managers and analysts. These people may be the domain experts who can provide the business requirements for the information integration flow design. Processes expressed using hypercube operations can be readily understood by them and this may help to ensure that the information integration flow design can capture the business requirements.

Because hypercubes may be a generalization of relational tables, and because information integration operators may be table oriented, hypercube operations may be easily translated into a logical information integration flow design model. The ability to move a hypercube representation into a logical information integration flow may reduce development times for creating the logical model. The use of a formal language for a conceptual model may reduce development time for a logical information integration flow design and may improve accuracy of implementing the conceptual design. Using hypercubes and hypercube operations as the formal model may facilitate communication between information integration flow designers and the business experts who are the end-users of the system. A method in accordance with an embodiment of the invention may assist in capturing and representing these business needs in a comprehensive design that can be translated into an information integration flow design.

FIG. 2 depicts information integration flow design lifecycle 200 in accordance with an embodiment of the invention. The bottom portion of information integration flow design lifecycle 200 depicts a conceptual model of the flow design. A conceptual model for an information integration flow may convey data source object(s) 202, 204, 206 (that may be located within one or more of data store(s) 212, 214, 216), data warehouse target object(s) 230, 232, and a high-level description of transformation function(s) 220, 222, 224 (that may convert the data store source data to the data warehouse target data). The term "high-level" refers to a model that may be in terms of business objects and operations as opposed to the IT-level objects presented by the information integration flow logical and physical models (e.g., files, tables, and code). The conceptual model may be comprehensible to the business domain expert for a particular information integration flow when it is presented at a high-level.

An information integration flow may comprise three, or more, phases, (e.g., extract, transform and load). An information integration flow in accordance with an embodiment of the invention may include various information integration flow styles. These styles may include (a) Extract-Transform-Load (ETL) where, after extraction from a data source, data may be transformed and then loaded into a data warehouse; (b) Extract-Load-Transform (ELT), where, after the extraction, data may be first loaded to the data warehouse and then transformation and cleansing operations may be applied; and (c) Extract-Transform-Load-Transform (ETLT), where, after the extraction, several lightweight transformations (e.g., large data reduction operations) may be applied, then the data may be loaded to the data warehouse machine, and then more heavy transformation operations may take place.

With reference to FIG. 2, the conceptual model represents each phase of the information integration flow.

Extract Phase

At a conceptual level, the extract phase may model the interface between data source object(s) 202, 204, 206 and transformation function(s) 220, 222, 224. The data sources are the information objects in the operational systems of an enterprise (e.g., order-entry, supply-chain, shipping, invoices). These information objects may themselves represent data objects and/or business processes. For each instantiation of the information integration process, a subset of information from the data sources may be extracted as input to the transformation phase. The conceptual model for extract may convey the data source objects and the particular subset of interest (e.g., all orders in the last week, yesterday's invoices, etc.).

The extract phase may itself transform data objects into different objects that may be amenable to processing in the transformation phase. The output of the extract phase is a set of business data objects that may be input to the transformation phase. These data objects may be represented in the conceptual design as hypercubes, rather than files or tables which may be the storage format in operational systems.

For example, the conceptual objects extracted from an order-entry system might be a hypercube for recent orders and individual hypercubes for new products, new customers, etc. In contrast, a logical (and physical) information integration flow model may present an IT-level view in which data is extracted into tables and files. Hypercubes present a business domain view and may make the conceptual model independent of changes at the logical and physical levels—e.g., new tables, or indices that might be added for performance reasons but do not modify the underlying conceptual objects, or other logical and/or physical level characteristics.

The specific business objects produced by the extract phase may depend on the needs of the business. For example, information about new orders could be extracted into a single hypercube object or into two or more hypercube objects—e.g., one hypercube for order summary information (e.g., date, customer, and amount) and a second hypercube for order detail information (e.g., product number, quantity sold, unit price). The number of hypercube objects produces by the extract phase may depend on the business itself.

In the conceptual model the output of the extract phase may be a set of hypercubes: $XC_1 \ldots XC_n$, where the schema for a hypercube may define its dimensions (e.g., date, time, customer, product, etc.) and the contents of its cells (e.g., quantity sold, sale amount, taxes, etc.).

In an embodiment of the invention, to enable semi-automatic translation of the conceptual model to a logical model, the conceptual model may require additional specifications. A list of the logical source objects: $S_1 \ldots S_k$, in the operational systems, e.g., the specific tables and files that are read during the extract; and a mapping from the source objects to the extract hypercubes—e.g., $\{S_i\} \times \{XC_j\}$. Depending on the business needs of a project, the conceptual model may present various views, each with different levels of abstraction and detail.

Load Phase

The load phase of an information integration flow conceptual model may describe how the load hypercubes (e.g., product fact 208, customer fact 210) may be incorporated into the data warehouse target object(s) 230, 232.

The data warehouse may be modeled as a star schema in which a large fact table (e.g., orders) references numerous, smaller dimension tables (e.g., products, customers, stores, dates, etc.). The star schema may be modeled as a hypercube where the cells of the hypercube correspond to values in the fact table (e.g., order amount, total tax, etc.) and the dimensions of the hypercube correspond to the dimension tables (e.g., customer details, product details, etc.) that are referenced from the fact table.

In the conceptual model, each fact table and its dimensions could be modeled as a single hypercube or it could be modeled as one hypercube for each dimension plus one for the facts. The choice may be made dependent on business requirements. For example, if a dimension has some identity and properties that may change over time, e.g., a customer, then it may make sense to create a separate business object (hypercube) for that dimension. Other objects such as date and time might not merit a separate hypercube and could be incorporated directly into the fact hypercube.

Formally, the load phase may be specified by a set of load hypercubes: $LC_1 \ldots LC_m$, each with its own schema, a set of target objects in the logical model of the data warehouse: $T_1 \ldots T_r$, and a mapping $\{LC_i\} \times \{T_j\}$ between the two.

Transformation Phase

The transformation phase may express the business rules (e.g., transformation function(s) 220, 222, 224) that may map data source object(s) 202, 204, 206 to load hypercubes 208, 210.

Because both the data source objects and the data warehouse target objects may be hypercubes, transformation function(s) 220, 222, 224 may be expressed as a series of steps, where each step is a hypercube operation. A hypercube operation may be an intrinsic hypercube operation and/or a high-level macro operation comprising intrinsic and other macro operations. By defining the transformation functions as a higher-level, abstract series of hypercube operations the information integration flow conceptual model may be more readable and may enable reuse of functionality. Therefore, a set of intrinsic macro operators may be used.

The macro operators may have parameters so their instantiation (or expansion) may have different forms, depending on the parameters. In addition, an information integration flow designer may define additional macro operators that are specific to an information integration project. For example, surrogate key generation is a frequent operation in information integration making it an appropriate candidate for an intrinsic macro operation (e.g., identity resolution, etc.). On the other hand, normalizing postal addresses may not be a good candidate for an intrinsic macro operation due to the wide variety of encodings of addresses and the various tools for cleaning and transforming addresses.

Formally, the transformation phase may be defined as a function that may map the extract hypercubes to a set of load hypercubes, e.g., $\{LC_i\}=F(\{XC_j\})$. The function F may itself be a graph of operators as follows.

Let TN be the set of all intrinsic hypercube operators, TM be the set of all macro hypercube operators, and T be the set of all hypercube operators, e.g., TN∪TM. Then F is a graph of operators that may map one set of hypercubes to another set, i.e., $\{XC_j\} \to f_1 \to \{C_1\} \to f_2 \to \{C_2\} \to \ldots \to f_k \to \{LC_i\}$, where each transformation $f$ is an element of T, and $C_i$ represents a set of temporary, intermediate hypercubes. Each macro transformation, TM, when expanded, may itself be a series of hypercube operators, but where each function $f$ is an intrinsic operator in the set TN.

Producing the Logical Design

Figure 3:
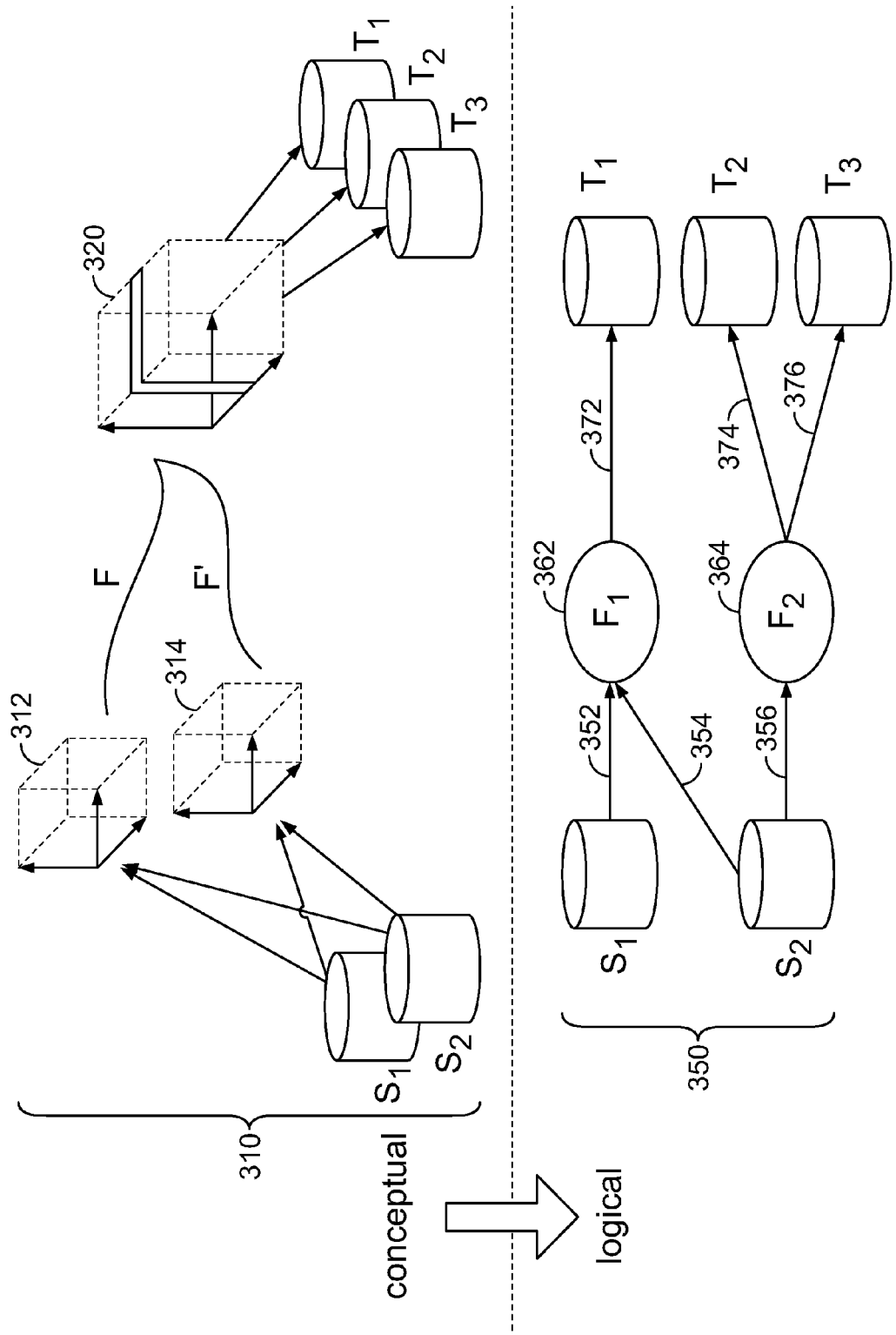
FIG. 3 depicts a block diagram of conceptual and logical designs of an information integration flow in accordance with an embodiment of the invention.

FIG. 3 depicts a simplified block diagram of both a conceptual model and a logical model design of an information integration flow in accordance with an embodiment of the invention. Conceptual flow model 310 may include data stores S1, S2 containing data that may be extracted and combined into data source objects 312, 314. As discussed above, data source objects 312, 314 may be hypercubes. Transformation functions F, F' may represent the series of hypercube operations that can perform the business rules to be applied to the content of data source objects 312, 314. Load hypercube 320 may contain the result of the transformation of the data source objects. The contents of transformation hypercube 320 may be mapped into data warehouse targets T1, T2, T3.

Logical flow model 350 may correspond to conceptual flow model 310. The logical flow model is depicted as a directed acyclic graph (DAG). A DAG is a graphic-based representation that may model several different kinds of structure in, for instance, computer science. The DAG may represent a set of sequence of data flow and control as edges (lines). Data may enter a node, which may represent a processing element or step (e.g., transformations, operations, steps, tasks, activities), through its incoming edges and leaves the vertex through its outgoing edges. Design constructs may be used to automatically create executable scripts for running the information integration process from the DAG. Logical flow model depicts data flow from data stores S1, S2 along edges 352, 354, 356 to vertices 362, 364. The vertices may represent a graph of the operators which perform functions $F_1$, $F_2$. Functions $F_1$, $F_2$ may correspond to transformation functions F, F'. The result of functions $F_1$, $F_2$ may be sent along edges 372, 374, 376 to be stored in data warehouse targets T1, T2, T3.

Figure 4:
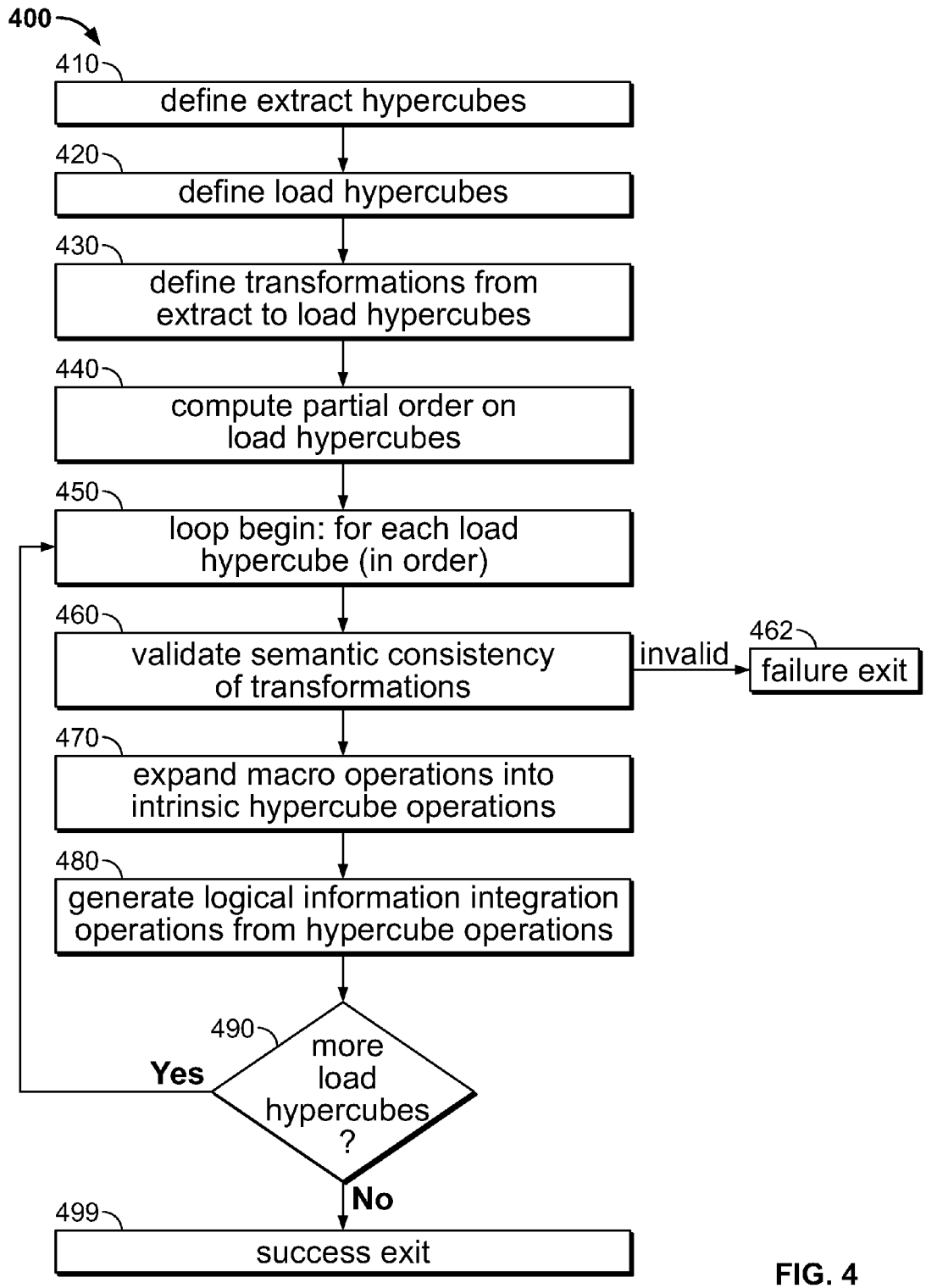
FIG. 4 depicts a process in accordance with an embodiment of the invention.

FIG. 4 depicts process 400 for generating a logical information integration flow from a conceptual model in accordance with an embodiment of the invention. Process 400 may be expressed in a high-level formal language.

Process 400 may begin by defining, step 410, and extracting an extract hypercube. For example, an on-line retail enterprise's order-entry system may generate order details as well as updates to customer data and product data. For such an enterprise there can be several business data source objects (e.g., customers, products, orders, and order line items (individual products specific to a particular order of a customer)) extracted from the data stores. Each of these data source objects may correspond to an extract hypercube. A decision can be made for business reasons as to whether order data could be extracted to one data source object (e.g., an orders cube having line item details) or as two separate data source objects (e.g., an orders summary cube and a line items cube).

The nature of the data being extracted may also guide the definition of the extract hypercubes. For example, the operational system may store customer information in multiple tables—e.g., customer profile information in one table, customer demographic information in another, customer addresses in another, and customer identity in another.

The details of the logical storage schema are not relevant to the business user. In fact, including such details in the conceptual model may make the conceptual model dependent on the logical storage schema so that any change to the logical schema may require a change to the conceptual model. Such a dependency is an undesirable effect violating the abstraction of the conceptual level. Therefore, the conceptual model may present customer information as a single hypercube regardless of the logical schema at the source.

The conceptual model may include annotations that specify how that hypercube is created from the source objects—e.g., the relational algebra operations to join the customer, profile, tables, surrogate key generation (e.g., identity resolution, described below), etc. These annotations need not to be exposed to the business user but can be. The annotations may be used in creating a logical model from the conceptual model.

Figure 5:
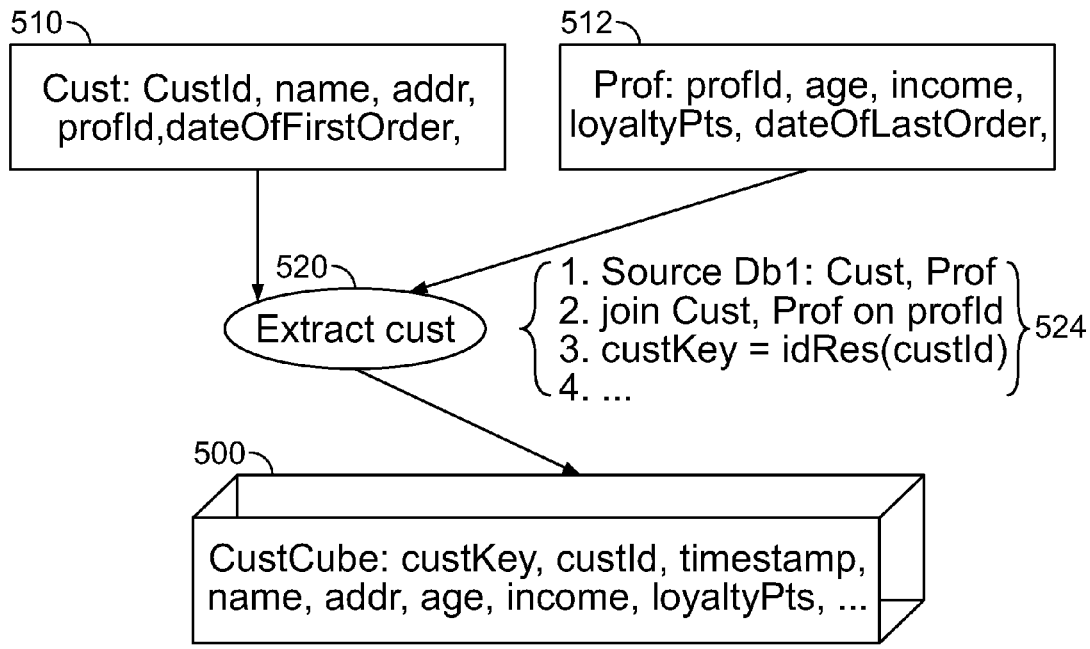
FIG. 5 depicts attributes of an extract hypercube in accordance with an embodiment of the invention.

The annotations may specify attributes used to specify the subset of source data extracted. FIG. 5 depicts attributes of an extract hypercube 500. The source data hypercube may include a timestamp attribute and annotations for the extract phase should specify the timestamp range for each instance of running the extract flow; e.g., extract customer changes for the previous hour, the previous day, last week, and so on. Data store content 510 may contain customer identity information (e.g., customer id number, name, address, profile id, etc.). Data store content 512 may contain profile demographic information (e.g., age, income, loyalty points, etc.). Extract operation 520 may perform a data extraction from the data source objects. The extract operation may use operators 524 (e.g., join, identity resolution, etc.).

With reference to FIG. 4, process 400 may define, step 420, one or more load hypercube(s). Defining the load hypercube may be based on business decisions, and the content of the load hypercube may reflect the changing nature of the data itself. Data warehouse dimensions may be static or slowly changing. For example, days of the week and months of the year are known and do not change. A list of states in the U.S. may change rarely, while a list of cities may change occasionally. A list of products and/or customers may change with some regularity.

For dimensions that change, it is a business decision if the data warehouse should record details of the changes (i.e., the history of the object) or not. If the details are to be recorded in the data warehouse, the load hypercube definition needs to include that dimension. When a customer address changes, it may not be useful to track the previous addresses. If a product price changes, it may be important to track when the price change occurred and also the previous price.

Figure 6:
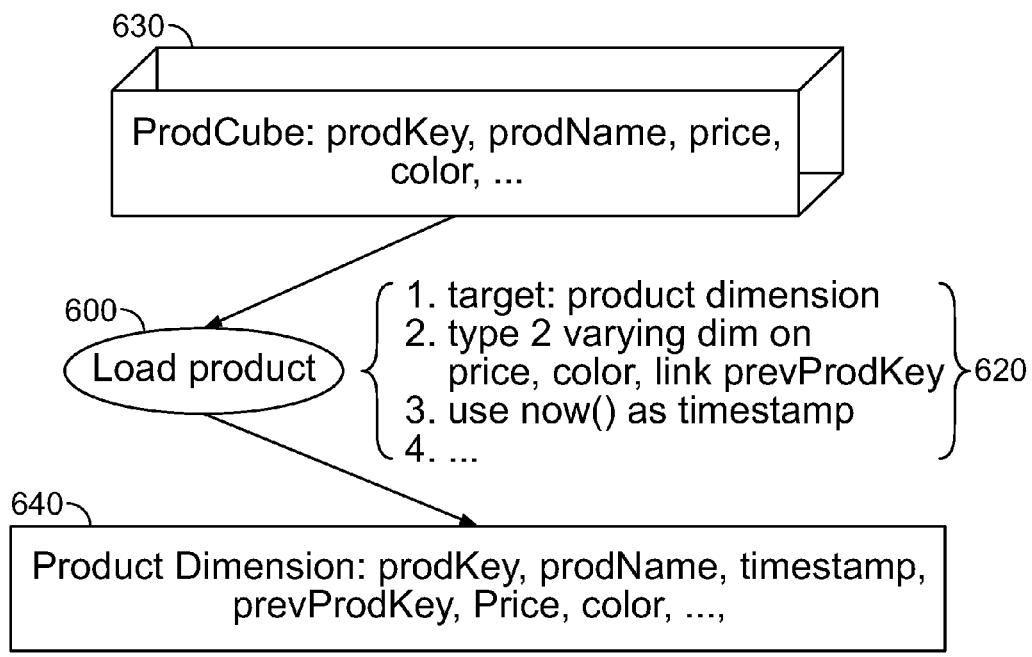
FIG. 6 depicts a macro hypercube load operation in accordance with an embodiment of the invention.

At the conceptual level, there may not be a single, macro operation for maintaining an object's history. Annotations are used to hide the detailed hypercube operations so that a correct logical model can be generated. FIG. 6 depicts hypercube load operation 600 that may use a macro for slowly changing dimensions in accordance with an embodiment of the invention. Load operation 600 includes parameters 620 that may specify particular attributes of dimensions that can be used to maintain an object's history in the data warehouse. Hypercube data source 630 may contain the information that includes changing dimensions to be maintained. Load operation 600 acts on the content of load hypercube 630 with attention to specific content specified by parameters 620. The result of load operation 600 may be placed in load hypercube 640.

With reference to FIG. 4, process 400 may define, step 430, one or more functions to transform an extract hypercube to a load hypercube. The conceptual model for the transformation phase may be expressed as a graph of hypercube operations and higher-level, macro operations. As discussed above with reference to FIG. 3, this graph may be a DAG.

As an example of a transformation definition, assume a load hypercube presents product sales per week, i.e., the total sales for each product sold for each week. The extract phase may produce a hypercube with order detail information, either as a separate hypercube or combined with the order summary. Therefore, the load hypercube can be expressed as a hypercube roll-up operation over the extract hypercube on the date (e.g., day, week, month, year, etc.) and product dimensions (product number, product group, and/or product line, etc.).

FIG. 7 depicts summary transformation function 720 in accordance with an embodiment of the invention. The summary transformation function may act on data content in extract hypercube 710. The extract hypercube may contain an order key, a product key, a customer key, etc. Summary transformation function 720 may total the quantity of items, calculate the total sales volume (currency units and/or pieces, etc.), and may group the data by product line, product group, and/or time unit. Load hypercube 730 may contain the result of summary transformation 720.

As another example, the generation of a surrogate key (identity resolution or IdRes) to represent each unique object in the warehouse (customer, order, and/or product, etc.) may be another transformation. The surrogate key may replace the natural object identifier from the source system; e.g., customer identifier, order number, etc. This transformation step may require a mapping table to record the natural source object identifier and its corresponding surrogate key. If the object identifier does not exist in the mapping table, a new surrogate key may be generated and an entry may be added to the mapping table.

This transformation may be, conceptually, a one-step operation that may be implemented by a hypercube macro method, IdRes. FIG. 8 depicts pseudo code for a macro to implement IdRes in accordance with an embodiment of the invention. FIG. 8 shows the macro expressed as a series of intrinsic hypercube operations.

The concept of identity resolution may be meaningful at the business level but the details of checking and updating the mapping table are not relevant to the business domain expert. When the logical model is generated, the macro may be expanded to hypercube operations that may then be converted at the logical level to relational algebra and information integration operators so the appropriate mapping tables can be accessed and updated.

As another example of a transformation operation, a task in data warehouses is banding, i.e., mapping a numeric value range to a symbolic value such as the value for age becomes child, teen, adult, senior or the value for income becomes low, middle, upper-middle, high, etc. This can be expressed as a single join operation between the extract hypercube, say customers, and a banding hypercube that describes the mapping. Although the conceptual model could present banding as a hypercube join operation, as with surrogate key generation, it may be more meaningful to define an intrinsic macro operation, banding, that may take as arguments, the extract hypercube and relevant value and the banding hypercube and banding dimension. FIG. 9 depicts pseudo code for a macro to implement banding in accordance with an embodiment of the invention The pseudo code may implement the banding macro in terms of intrinsic hypercube operations.

Given banding and surrogate key generation as exemplar building blocks, a more general matching operation could be implemented. For example, suppose the data warehouse records customer details in multiple objects (e.g., one warehouse dimension for customer identity, a second for customer demographics, etc.). Therefore, there could be corresponding load hypercubes for each warehouse dimension. Suppose the extract phase produces a single hypercube containing all the customer details. As shown above, the identity resolution macro can be used to obtain a surrogate key from the customer identifier. However, a more general matching operation may be needed for customer demographics that would involve, for example, banding the customer age or income, searching the demographic dimension for a match, adding a new entry if none is found, etc. The result could be a surrogate key for customer demographics added to the customer hypercube. Then, two or more load hypercubes would be populated by hypercube slice operations over the customer hypercube. FIG. 10 depicts pseudo code to perform the hypercube slice operation in accordance with an embodiment of the invention.

As another example, suppose the source system generates extensible mark-up language (XML) documents to represent order information, where each document may include order summary and/or line item details, etc. In addition, suppose the business requirements dictate separate hypercubes for order summary and details. In this case, the annotations could present the logical source object as an XML document and include the extensible stylesheet language transformation (XSLT) operators to extract the order summary information into one hypercube, and the order detail information into a second hypercube.

With reference to FIG. 4, process 400 may compute, step 440, a partial order on load hypercubes. There may be dependencies among the load hypercubes that may be maintained. For example, when loading a hypercube representing a fact table in a star schema, it may be important to first load hypercubes that represent dimensions referenced by the fact hypercube.

Process 400 then may perform a loop, steps 450-490, for each load hypercube in order. At step 460, a semantic consistency check is performed to ensure that the flow is valid. If the semantic consistency is invalid, process 400 may proceed to step 462 and terminate in failure. The semantically inconsistent flow may be corrected and reprocessed.

If the semantic consistency is valid, macro operations may be expanded, step 470, into intrinsic hypercube operations. This macro expansion may produce a flow consisting entirely of intrinsic hypercube operators.

Logical information integration operations (e.g., relational algebra operators, and/or operators specific to commercially available information integration tools) may be generated, step 480, from the intrinsic hypercube operators of step 470. If there are more load hypercubes, step 490, process 400 returns to step 450. If not, process 400 successfully terminates, step 499.

A method in accordance with an embodiment of the invention may use formal language to capture business requirements and create a conceptual model by using hypercubes. Hypercubes may follow the cube paradigm which may be inherent in business analysis and decision support. The method may connect information integration flow design projects with capturing of business rules and creating a logical model.

A method in accordance with an embodiment of the invention may use hypercubes as the basis for a conceptual model to instruct on extract, transform and load phases using intrinsic hypercube operators along with high-level macros built on other operators. The method may facilitate direct translation to a logical model through conversion of the hypercube operators to relational and information integration operators. This reduces design and development time and improves accuracy because the conceptual model can be read and understood by business domain experts.

Figure 11:
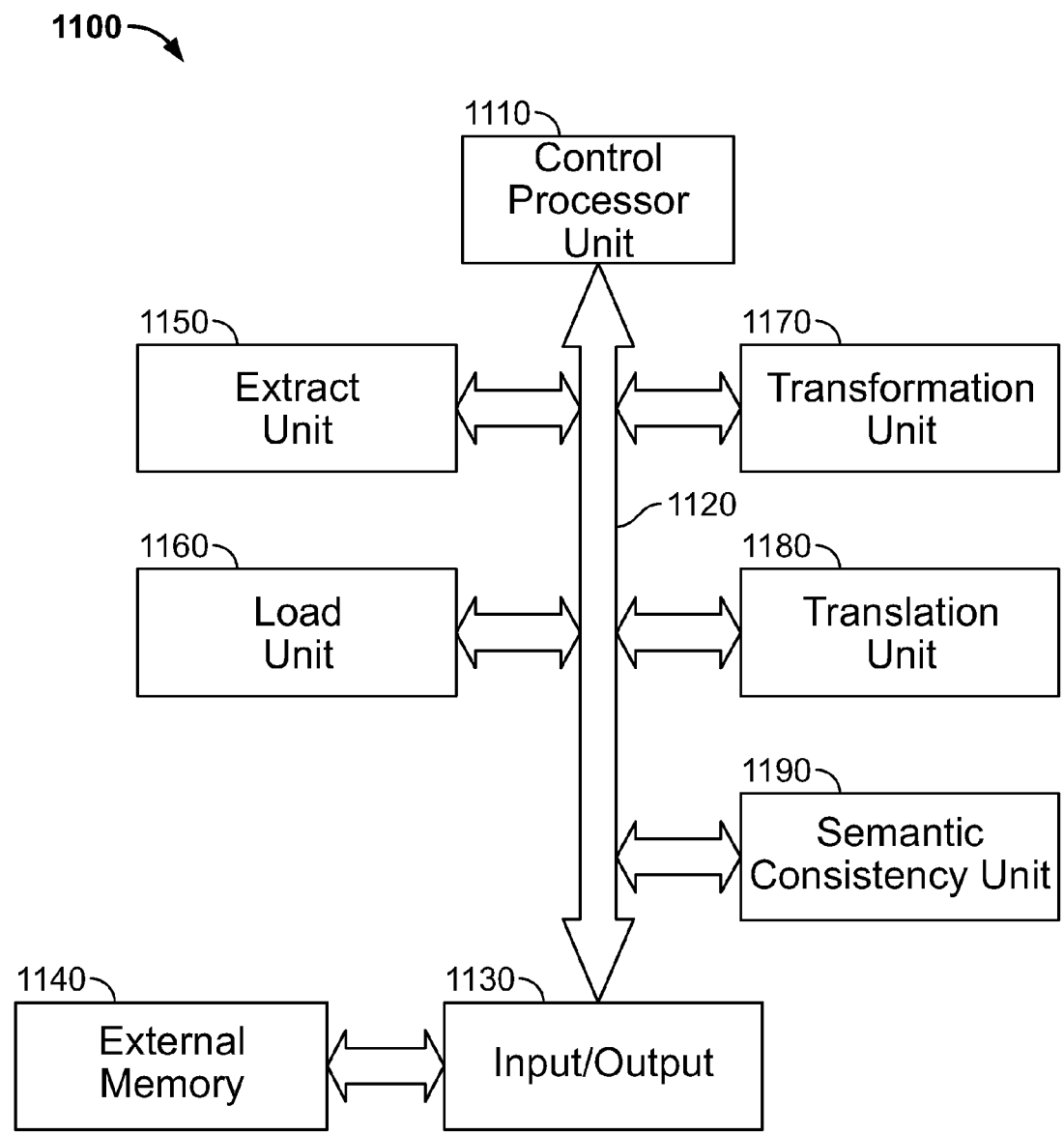
FIG. 11 depicts a system in accordance with an embodiment of the invention.

FIG. 11 depicts a schematic of components of system 1100 in accordance with an embodiment of the invention. System 1100 may include control processor 1110 that may be connected to an internal bus 1120. The controller may be a processing unit, a field programmable gate array, discrete analog or digital circuitry, etc. Control processor 1110 may access a computer application program stored in non-volatile memory internal to control processor 1110 (not shown) or stored in external memory 1140. External memory 1140 may be connected to control processor 1110 via input/output (I/O) port 1130. The computer application program may cause control processor 1110 to perform one or more of the above-described methods when executed.

System 1100 may include extract unit 1150 that may model an interface between a data source information object and a transformation function based on one or more extract hypercubes. The extract interface model may include one or more hypercube operators. Extract unit 1150 may be implemented by dedicated hardware, software modules, and/or firmware, where control processor 1110 executes the instructions. Other units discussed herein may also be implemented by dedicated hardware units, software modules, and/or firmware, where control processor 1110 executes the instructions.

System 1100 may also include load unit 1160 that may specify a load hypercube and a data warehouse target object. Load unit 1160 may also incorporate the data source information object into the data warehouse target schema.

Transformation unit 1170 may express transforming the conceptual model to a logical model as a function containing one or more hypercube operations. The expressed function may include mapping the extract hypercube to the load hypercube. Also, the function may map the data source information object(s) (discussed above) to the data warehouse target object's schema. The functions expressed by the transformation unit may be implemented as a series of macro operators.

System 1100 may include translation unit 1180 that may translate, and/or generate, a conceptual model of the information integration flow design into a logical model of the information integration flow design by implementing the operations of extract unit 1150, load unit 1160, and transformation unit 1170.

System 1100 may also include semantic consistency unit 1190 that may check the semantic consistency of the information integration flow design. This consistency check may be performed prior to translation unit 1180 translating the information integration flow design from a conceptual to logical model In accordance with an embodiment of the invention, a computer program application stored in non-volatile memory, or computer-readable medium (e.g., hard drive, flash memory, CD ROM, magnetic media, etc.) may include code or executable instructions that when executed may instruct or cause a controller or processor to perform methods discussed herein such as generating an information integration flow design by beginning with conceptual business level objectives and ending with logical flow design, while injecting several layers of optimization and validation throughout the process.

While there have been shown and described fundamental novel features of the invention as applied to several embodiments, it will be understood that various omissions, substitutions, and changes in the form, detail, and operation of the illustrated embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A system comprising:
a non-transitory storage medium storing instructions; and
a processor, the instructions executable on the processor to:
receive a conceptual model of an information integration flow design, the conceptual model having an extract phase, a load phase, and a transformation phase, the conceptual model comprising a data source information object, a transformation function, and a data warehouse target object;
extract source data from a data source into the data source information object that is according to an extract hypercube;
model an interface between the data source information object and the transformation function based on the extract hypercube;
map, using the transformation function, the data source information object to a load hypercube; and
load data in the load hypercube into the data warehouse target object.

2. The system of claim 1, further comprising including in the conceptual model at least one annotation specifying how the extract hypercube is created from the data source information object.

3. The system of claim 1, wherein the conceptual model includes one or more high-level semantics of the information integration flow design.

4. The system of claim 1, wherein the instructions are executable on the processor to machine translate the conceptual model into a logical model.

5. The system of claim 1, wherein the instructions are executable on the processor to check a semantic consistency of the information integration flow design.

6. The system of claim 1, wherein one or more steps of the transformation function are expressed as a hypercube operation based on the load hypercube, the load hypercube containing a result of transformation, by the hypercube operation of the transformation function, of data in the data source information object.

7. The system of claim 6, wherein the extract hypercube is a member of a set of extract hypercubes extracted from respective data source information objects, the load hypercube is a member of a set of load hypercubes, and the hypercube operation is part of a set of hypercube operations to map the set of extract hypercubes to the set of load hypercubes.

8. The system of claim 7, wherein the set of hypercube operations comprises a graph of hypercube operations.

9. The system of claim 7, wherein the instructions are executable to load data of the load hypercubes into respective data warehouse target objects that are part of at least one data warehouse.

10. The system of claim 1, wherein the data warehouse target object is modeled as a star schema in which a fact table references dimension tables, and the star schema is modeled as the load hypercube where cells of the load hypercube correspond to values in the fact table, and dimensions of the load hypercube correspond to the dimension tables.

11. The system of claim 1, wherein the data warehouse target object is part of a data warehouse that provides a repository of data converted from data sources according to transformation functions of the conceptual model.

12. A method comprising:
receiving, by a system comprising a processor, a conceptual model of an information integration flow design, the conceptual model comprising data source information objects, transformation functions, and data warehouse target objects;
extracting, by the system, source data from data sources into respective data source information objects that are according to extract hypercubes;
modeling, by the system, an interface between the data source information objects and the transformation functions based on the extract hypercubes;
mapping, by the system using the transformation functions, the data source information objects to corresponding load hypercubes; and
loading, by the system, data in the load hypercubes into the data warehouse target objects.

13. The non-transitory computer readable medium of claim 12, wherein the instructions upon execution cause the system to further machine translate the conceptual model into a logical model that includes a graph comprising data source information objects, transformation functions, and data warehouse target objects.

14. The method of claim 12, wherein each transformation function of the transformation functions is expressed as a corresponding hypercube operation, and each respective load hypercube of the load hypercubes contains a result of transformation, by the hypercube operation of a corresponding transformation function of the transformation functions, of data in a corresponding data source information object of the data source information objects.

15. The method of claim 14, wherein the hypercube operations are part of a graph of hypercube operations.

16. The method of claim 12, wherein a first data warehouse target object of the data warehouse target objects is modeled as a star schema in which a fact table references dimension tables, and the star schema is modeled as a first load hypercube of the load hypercubes, where cells of the first load hypercube correspond to values in the fact table, and dimensions of the first load hypercube correspond to the dimension tables.

17. A non-transitory computer readable medium storing instructions that upon execution cause a system to:
receive a conceptual model of an information integration flow design, the conceptual model having an extract phase, a load phase, and a transformation phase, the conceptual model comprising a data source information object, a transformation function, and a data warehouse target object;
extract source data from a data source into the data source information object that is according to an extract hypercube;
model an interface between the data source information object and the transformation function based on the extract hypercube;
map, using the transformation function, the data source information object to a load hypercube; and
load data in the load hypercube into the data warehouse target object.

18. The non-transitory computer readable medium of claim 17, wherein one or more steps of the transformation function are expressed as a hypercube operation, and the load hypercube contains a result of transformation, by the hypercube operation, of data in the data source information object.

19. The non-transitory computer readable medium of claim 18, wherein the extract hypercube is a member of a set of extract hypercubes extracted from respective data source information objects, the load hypercube is a member of a set of load hypercubes, and the hypercube operation is part of a set of hypercube operations to map the set of extract hypercubes to the set of load hypercubes.

20. The non-transitory computer readable medium of claim 19, wherein the set of hypercube operations comprises a graph of hypercube operations.

* * * * *